United States Patent
Yoo et al.

(10) Patent No.: US 10,367,206 B2
(45) Date of Patent: Jul. 30, 2019

(54) METHOD FOR PREPARING METAL CATALYST SUPPORTED IN POROUS CARBON SUPPORT USING PLANT

(71) Applicant: KOREA INSTITUTE OF SCIENCE AND TECHNOLOGY, Seoul (KR)

(72) Inventors: Sung Jong Yoo, Seoul (KR); Dong Wook Lee, Seoul (KR); So Young Lee, Seoul (KR); Jin Young Kim, Seoul (KR); Jong Hyun Jang, Seoul (KR); Hyoung-Juhn Kim, Seoul (KR); Hyun Seo Park, Seoul (KR); Gil-Pyo Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/910,290

(22) Filed: Mar. 2, 2018

(65) Prior Publication Data

US 2018/0254491 A1    Sep. 6, 2018

(30) Foreign Application Priority Data

Mar. 6, 2017 (KR) .......... 10-2017-0028254

(51) Int. Cl.
| | |
|---|---|
| *H01M 4/90* | (2006.01) |
| *H01M 8/1018* | (2016.01) |
| *H01M 4/92* | (2006.01) |

(52) U.S. Cl.
CPC ....... *H01M 4/9083* (2013.01); *H01M 4/9041* (2013.01); *H01M 4/926* (2013.01); *H01M 8/1018* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 9,190,222 B1 | 11/2015 | Zhang et al. | |
| 2014/0220459 A1* | 8/2014 | Iida ............ | H01M 4/9083 429/405 |

FOREIGN PATENT DOCUMENTS

| | | |
|---|---|---|
| JP | 2010-100516 A | 5/2010 |
| KR | 10-2008-0009539 A | 1/2008 |

(Continued)

OTHER PUBLICATIONS

Clark et al.; Supported Palladium Nanoparticles Synthesized by Living Plants as a Catalyst for Suzuji-Miyaura Reactions; PLOS One; vol. 9, Issue 1, e87192; Jan. 2014.*

*Primary Examiner* — Guinever S Gregorio
(74) *Attorney, Agent, or Firm* — Rabin & Berdo, P.C.

(57) ABSTRACT

A method for preparing a metal catalyst supported on a porous carbon support using a plant, including: (a) a step of preparing a plant; (b) a step of preparing a metal precursor-absorbed plant by absorbing a metal precursor into the plant; (c) a step of preparing a catalyst precursor by drying the metal precursor-absorbed plant; (d) a step of preparing a char by charring the catalyst precursor; and (e) a step of preparing a metal catalyst supported on a porous carbon support by treating the char with an acid. The method for preparing a metal catalyst supported on a porous carbon support of the present disclosure, whereby a plant itself is charred, is environment-friendly and allows for convenient large-scale synthesis. The metal catalyst supported on a porous carbon support prepared thereby can be used as electrode materials of various energy devices, particularly as an electrode catalyst of a fuel cell.

11 Claims, 6 Drawing Sheets

(56) References Cited

FOREIGN PATENT DOCUMENTS

| KR | 10-2011-0109350 A | 10/2011 |
| KR | 10-2015-0061670 A | 6/2015 |

\* cited by examiner

METHOD FOR PREPARING METAL CATALYST SUPPORTED IN POROUS CARBON SUPPORT USING PLANT

CROSS-REFERENCE TO RELATED APPLICATIONS

This application claims, under 35 U.S.C. §§ 119, the priority of Korean Patent Application No. 10-2017-0028254 filed on Mar. 6, 2017 in the Korean Intellectual Property Office, the disclosure of which is incorporated herein by reference in its entirety.

TECHNICAL FIELD

The present disclosure relates to a method for preparing a metal catalyst supported on a porous carbon support, more particularly to a method for preparing a metal catalyst supported on a porous carbon support that can be used as an electrode material of various energy devices, particularly a fuel cell.

BACKGROUND

A fuel cell has a structure in which an electrolyte is sandwiched between two electrodes formed of porous metal or carbon. This structure is called a single cell. At an anode, hydrogen gas or another fuel is supplied from outside, approaches a reaction zone through pores in the electrode and is converted to active hydrogen atom by being adsorbed onto a catalyst in the electrode. As the hydrogen atom is to hydrogen ions, two electrons are drawn from the anode to a cathode on the opposite side through an external circuit, resulting in electric current. At the cathode, oxygen supplied from outside, the hydrogen ions delivered through the electrolyte and the electrons delivered through the external circuit react, producing water.

In a polymer electrolyte membrane fuel cell (PEMFC), a platinum catalyst is commonly used to facilitate a reaction whereby hydrogen gas is oxidized to produce hydrogen ions at the anode. For example, a supported catalyst with a surface entirely or partly coated with platinum and molybdenum carbide or tungsten carbide is disclosed. However, the high cost and limited supply of platinum are an obstacle to commercialization of fuel cells.

Therefore, in order to decrease the use of the platinum catalyst, a method of using a conductive carbon material with a large specific surface area as a support and loading platinum in fine particulate state on the support, thereby increasing the specific surface area of the platinum catalyst, is employed.

In this regard, nanotechnology and carbon structures are promising technologies in the cutting-edge research fields of the future. To synthesize metal nanoparticles and carbon structures having superior properties via a simple and economical method is a very important task in the field of catalyst engineering. Although various metal nanoparticle synthesis methods and carbon structure synthesis methods have been developed, these methods are problematic in that they require complicated processes, are costly and require the addition of additional chemicals. The additionally added substances are various acidic or basic materials, many of which are harmful to the human body and the environment. Such economic and environmental disadvantages are acting as an obstacle to the industrialization of nanoparticle catalysts supported on carbon supports.

Accordingly, research and development of an economical and environment-friendly method for preparing a high-performance metal nanoparticle catalyst supported on a carbon support are necessary.

REFERENCES OF THE RELATED ART

Patent Documents

Korean Patent Publication No. 10-2011-0109350.
Korean Patent Publication No. 10-2008-0009539.

SUMMARY

The present disclosure is directed to providing a method for preparing a metal catalyst supported on a porous carbon support using a plant which is environment-friendly and allows for convenient large-scale synthesis. Accordingly, the metal catalyst supported on a porous carbon support prepared thereby can be used as electrode materials of an energy device, particularly as an electrode catalyst of a fuel cell.

In an aspect, the present disclosure provides a method for preparing a metal catalyst supported on a porous carbon support using a plant, including: (a) a step of preparing a plant; (b) a step of preparing a metal precursor-absorbed plant by absorbing a metal precursor into the plant; (c) a step of preparing a catalyst precursor by drying the metal precursor-absorbed plant; (d) a step of preparing a char by charring the catalyst precursor; and (e) a step of preparing a metal catalyst supported on a porous carbon support by treating the char with an acid.

The catalyst precursor may contain one or more element selected from O, N, S, P and Si and a metal nanoparticle.

The metal precursor may be one or more selected from a metal acetylacetonate, a metal acetylacetate, a metal acetate, a metal halide, a metal nitrate, a metal hydroxide and a metal carbonyl complex.

A metal contained in the metal precursor may be one or more selected from cobalt (Co), platinum (Pt), palladium (Pd), copper (Cu), iron (Fe), manganese (Mn), molybdenum (Mo), vanadium (V), chromium (Cr), nickel (Ni), gold (Au), silver (Ag), zinc (Zn), rhodium (Rh) and ruthenium (Ru).

The drying in the step (c) may be performed by high-temperature drying at 60 to 120° C. or by freeze-drying at −80 to −60° C.

The step (d) may include: (d-1) a step of preparing a primary char by charring the catalyst precursor under an air condition; (d-2) a step of preparing a secondary char by charring the primary char under an inert gas condition; and (d-3) a step of preparing a tertiary char by charring the secondary char under an ammonia gas condition.

The charring (carbonization) in the step (d-1) may be performed at 150-220° C.

The charring (carbonization) in the step (d-2) may be performed at 750-1000° C.

The inert gas in the step (d-2) may be one or more selected from helium, neon, argon, krypton, xenon and radon.

The charring (ammonia treatment) in the step (d-3) may be performed at 700-800° C.

The treatment with an acid in the step (e) may be performed by dispersing the char in a strong acid selected from sulfuric acid, hydrochloric acid and nitric acid and washing the same.

The concentration of the strong acid may be 0.05-1.0 M.

After the step (e), the metal catalyst supported on a porous carbon support may be washed and dried to obtain a powder.

The method for preparing a metal catalyst supported on a porous carbon support of the present disclosure, whereby a plant itself is charred, is environment-friendly and allows for convenient large-scale synthesis. Accordingly, the metal catalyst supported on a porous carbon support prepared thereby can be used as electrode materials of various energy devices, particularly as an electrode catalyst of a fuel cell.

DETAILED DESCRIPTION OF EMBODIMENTS

Hereinafter, various aspects and exemplary embodiments of the present disclosure are described in more detail. Exemplary embodiments of the present disclosure will be described referring to the attached drawings, so that those of skill in the art to which the present disclosure belongs can easily carry out the present disclosure.

However, the following description is not intended to limit the present disclosure to specific exemplary embodiments and description about well-known elements will be omitted so as not to obscure the relevant details of the present disclosure.

The terms used in the present disclosure are used only to describe the specific exemplary embodiments and are not intended to limit the present disclosure. Unless the context clearly indicates otherwise, singular forms include plural forms as well. In the present disclosure, the terms "include/contain", "have", etc. specify the presence of stated features, numbers, steps, operations, elements or combinations thereof, but do not preclude the presence or addition of one or more other features, numbers, steps, operations, elements or combinations thereof.

Figure 1:
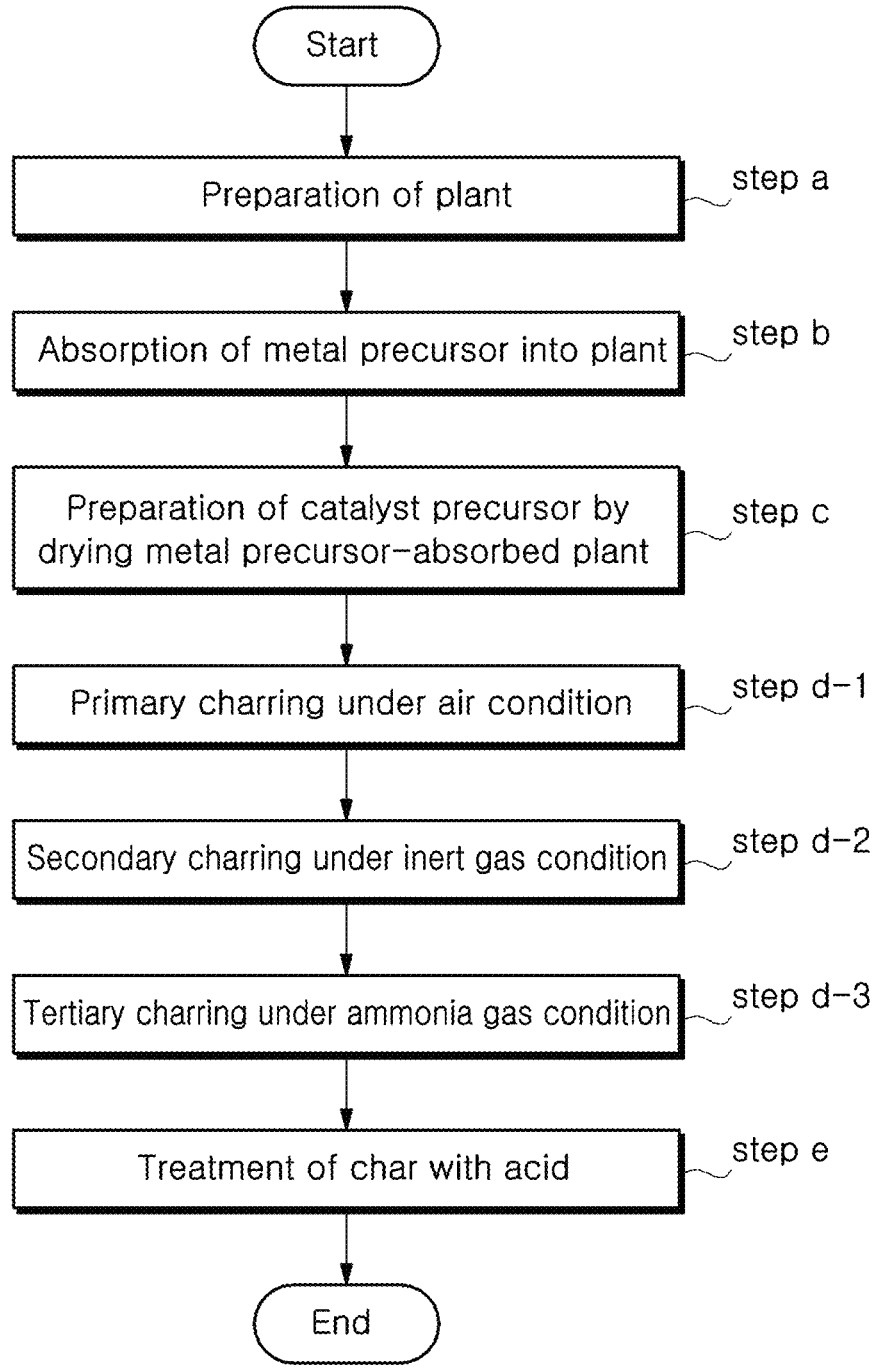
FIG. 1 is a flow chart describing a method for preparing a metal catalyst supported on a porous carbon support using a plant of the present disclosure.

FIG. 1 is a flow chart describing a method for preparing a metal catalyst supported on a porous carbon support using a plant of the present disclosure. Hereinafter, the method for preparing a metal catalyst supported on a porous carbon support using a plant of the present disclosure is described referring to FIG. 1.

First, a plant is prepared (step a).

The plant is not particularly limited. Specifically, a whole plant including the root, stem, etc., which is capable of absorbing a metal precursor, may be used.

In general, the plant contains organic substances consisting of C, H, O and N and may further contain other elements such as P, S, Na, Mg, K, etc.

Because a metal precursor is absorbed directly into the plant used in the present disclosure, the plant itself is used, rather than a plant extract. Accordingly, the related process is very simple.

Then, a metal precursor-absorbed plant is prepared by absorbing a metal precursor into the plant (step b).

The metal precursor may be a metal acetylacetonate, a metal acetylacetate, a metal acetate, a metal halide, a metal nitrate, a metal hydroxide, a metal carbonyl complex, etc. However, without being limited thereto, any compound allowing for absorption of a metal as a catalyst material into the plant may be used in the present disclosure.

The metal contained in the metal precursor may be cobalt (Co), platinum (Pt), palladium (Pd), copper (Cu), iron (Fe), manganese (Mn), molybdenum (Mo), vanadium (V), chromium (Cr), ruthenium (Ru) (nickel (Ni), gold (Au), silver (Ag), zinc (Zn), rhodium (Rh), etc.

The metal precursor may be dissolved in distilled water or an organic solvent and then the root and/or stem of the plant may be immersed therein for several days so that the metal precursor can be absorbed sufficiently.

As the organic solvent, DMAc (dimethylacetamide), NMP (N-methyl-2-pyrrolidone), DMF (dimethylformamide), DMSO (dimethyl sulfoxide), IPA (isopropyl alcohol), EtOH (ethanol), MeOH (methanol), etc. may be used. However, without being limited thereto, any organic solvent commonly used in the art may be used in the present disclosure.

Then, a catalyst precursor is prepared by drying the metal precursor-absorbed plant (step c).

The drying may be performed by high-temperature drying at 60 to 120° C.

If the drying is performed below 60° C., excessive time may be required for the drying. And, if the drying is performed above 120° C., the catalyst precursor may be deteriorated before charring.

The drying may also be performed by freeze-drying at −80 to −60° C.

When compared with the high-temperature drying, the freeze-drying is advantageous in that the structure of the plant may be maintained and the change in the components of the plant can be minimized after the drying.

The catalyst precursor may contain at least one element selected from O, N, S, P and Si and a metal nanoparticle. The metal nanoparticle is the same as the metal contained in the metal precursor described above.

Then, a char is prepared by charring the catalyst precursor (step d).

Specifically, the char may be prepared by the following three steps.

First, a primary char is prepared by charring the catalyst precursor under an air condition (step d-1).

Specifically, the primary charring under an air condition may be performed at 150-220° C. As a result, impurities on the surface of the catalyst precursor may be removed.

Next, a secondary char is prepared by charring the primary char under an inert gas condition (step d-2).

Specifically, the secondary charring under an inert gas condition may be performed at 750-1000° C. As a result, cellulose remaining in the primary char may be completely charred.

Then, a tertiary char is prepared by charring the secondary char under an ammonia gas condition (step d-3).

Specifically, the tertiary charring under an ammonia gas condition may be performed at 700-800° C. As a result, a nitrogen functional group may be attached to the secondary char.

Next, a metal catalyst supported on a porous carbon support is prepared by treating the char with an acid (step e).

The treatment of the tertiary char with an acid may be performed with a strong acid selected from sulfuric acid, hydrochloric acid and nitric acid. Specifically, it may be performed by dispersing the tertiary char in dilute sulfuric acid and washing the same.

Specifically, the concentration of the strong acid may be 0.1-1.0 M.

If the concentration of the strong acid is lower than 0.1 M, sufficient washing or pore formation may not be achieved. And, if the concentration exceeds 1.0 M, damage may be undesirably incurred to the catalyst.

Through the treatment with an acid, impurities remaining on the surface or other parts of the catalyst may be removed and pores may be formed well. The resulting porous structure may increase the surface area of the catalyst. As a result, when applied to a fuel cell, the catalyst may improve the capacity and efficiency of the cell.

After the treatment with an acid, the metal catalyst supported on a porous carbon support may be washed and then dried. As a result, the metal catalyst supported on a porous carbon support may be obtained as a black powder.

EXAMPLES

Example 1

Figure 2:
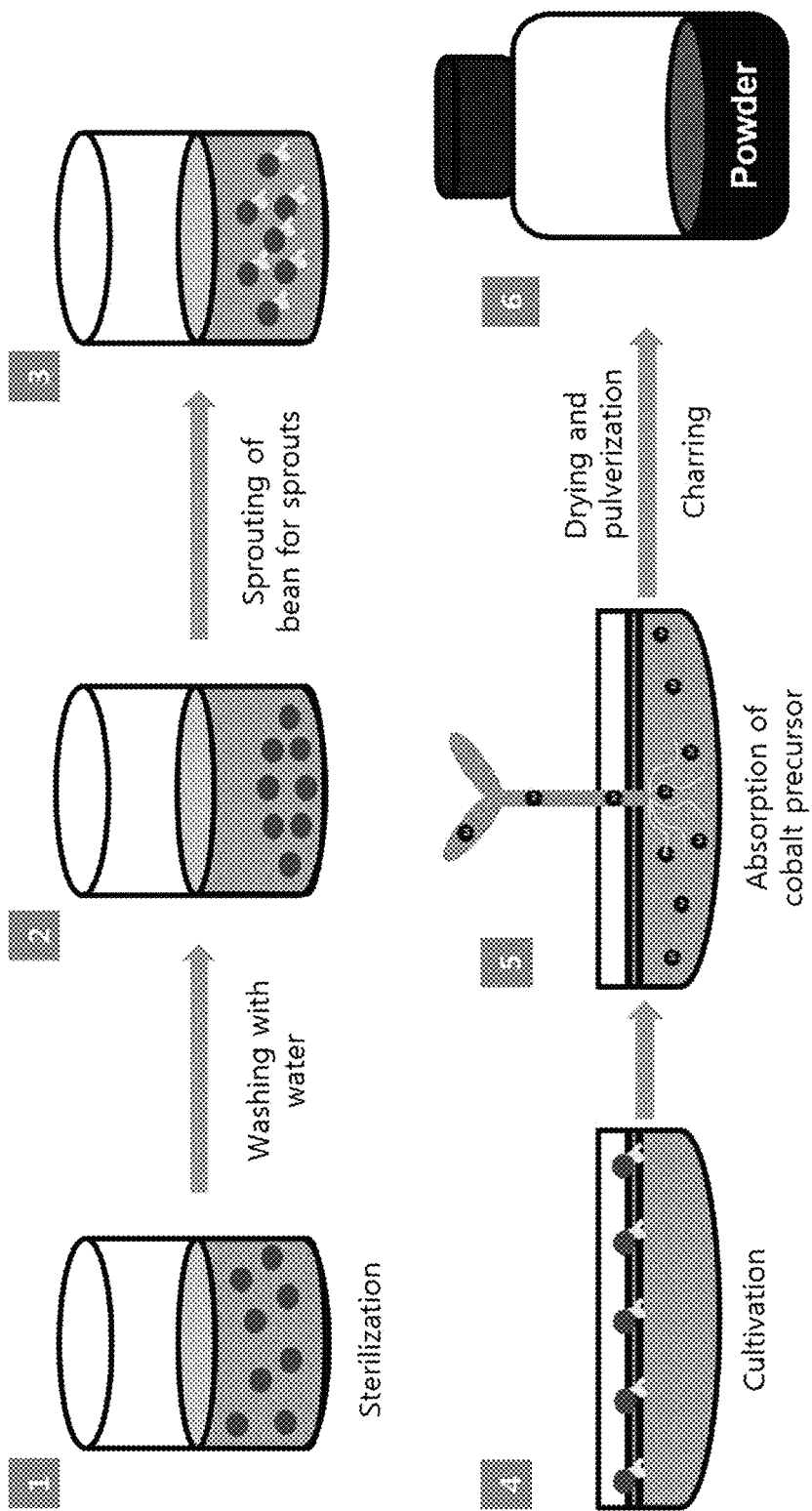
FIG. 2 is a schematic process diagram of a method for preparing a metal catalyst supported on a porous carbon support using a plant of Example 1 according to the present disclosure.

FIG. 2 is a schematic process diagram of a process of Example 1. Hereinafter, a method for preparing a cobalt catalyst supported on a porous carbon support of Example 1 is described referring to FIG. 2.

First, 200 g of a bean for sprouts was sterilized with hydrogen peroxide, rinsed with distilled water and sprouted in distilled water for 12 hours. The sprouted bean was cultivated for 5 days while watering adequately with triply distilled water.

The bean sprout cultivated for 5 days was immersed for 3 days in a pH 5.5 aqueous solution in which the cobalt precursor cobalt chloride was dissolved in triply distilled water at a concentration of 5%.

The, the cobalt chloride-absorbed bean sprout was dried in an oven at 100° C. for 24 hours and then pulverized to obtain a catalyst precursor powder. The catalyst precursor powder was transferred to a ceramic boat and charred sequentially under air, argon and ammonia flow while heating at a rate of 5° C./min.

Specifically, a primary charring under an air condition was performed at 200° C., a secondary charring under an argon condition was performed at 800° C., and a tertiary charring under an ammonia gas condition was performed at 750° C.

After the charring, the obtained blackish-grey powder was dispersed in dilute 0.5 M sulfuric acid to remove inorganic materials remaining in the catalyst. The blackish-grey powder dispersed in the sulfuric acid was sonicated, filtered in vacuo and washed to obtain a black catalyst powder. The black powder was dried in a vacuum oven at 60° C. for 24 hours to prepare a cobalt catalyst supported on a porous carbon support.

Example 2

A cobalt catalyst supported on a porous carbon support was prepared in the same manner as in Example 1, except that the secondary charring under an argon was performed at 900° C. instead of 800° C.

Comparative Example 1

A porous carbon support was prepared in the same manner as in Example 1, except that a metal precursor was not absorbed into the plant.

Comparative Example 2

Commercially available Pt/C (JM_Pt/C) was prepared by dispersing a platinum precursor and a carbon black support vigorously in an organic solvent and distilled water and adding a solution of a reducing agent by piecemeal, thereby supporting platinum on the carbon black support.

TEST EXAMPLES

Test Example 1: TEM and Mapping Analysis

The catalysts prepared in Examples 1 and 2 and the carbon support prepared in Comparative Example 1 were subjected to TEM analysis using the Titan equipment. The result is shown in FIG. 3.

Figure 3:
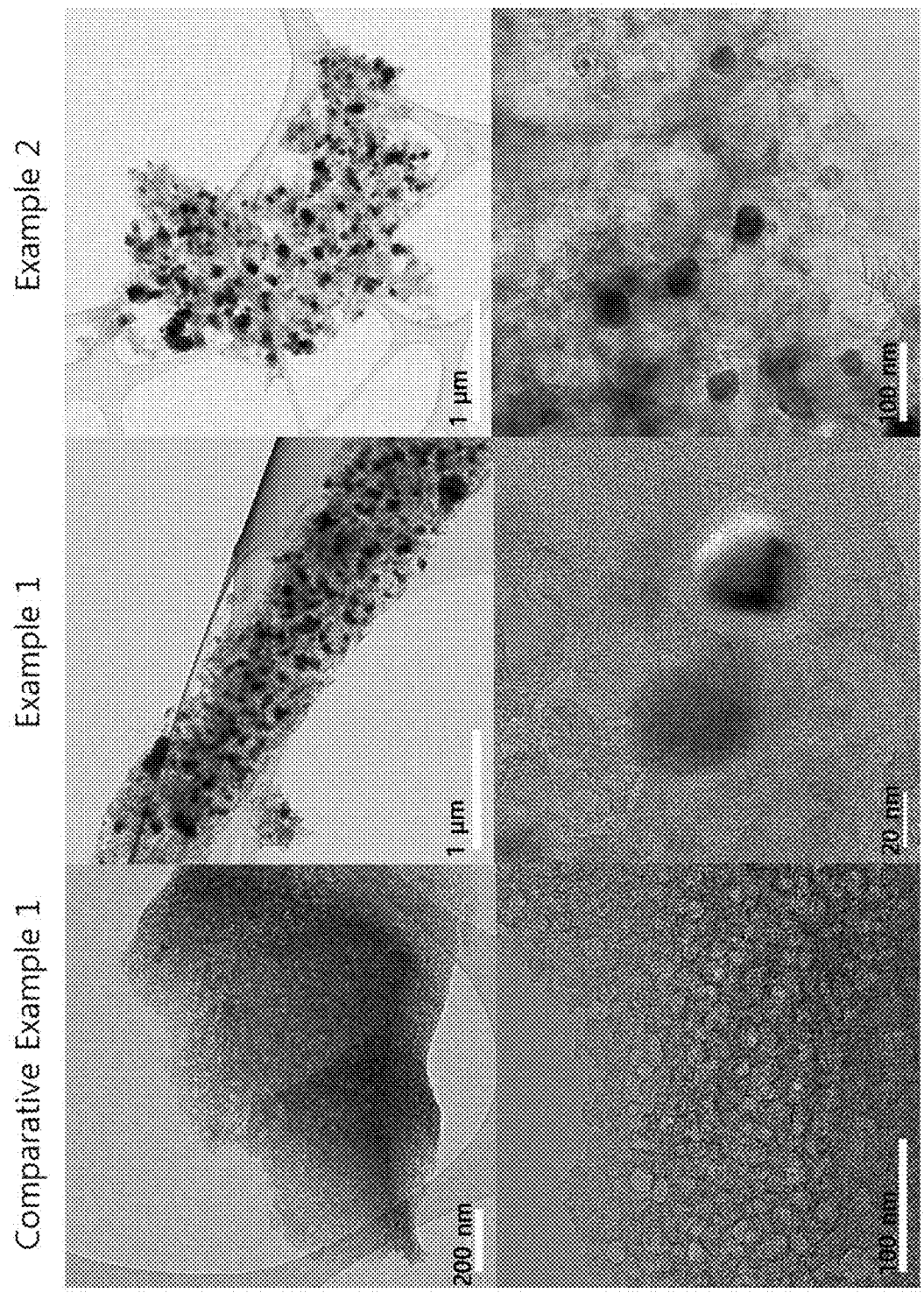
FIG. 3 shows TEM images obtained in Test Example 1.

Referring to FIG. 3, it was confirmed that a lot of pores are present in the carbon support and cobalt nanoparticles are supported inside the pores, for the catalysts of Examples 1 and 2. All the cobalt nanoparticles were present inside the carbon support and had particle diameters of 20-40 nm.

Figure 4:
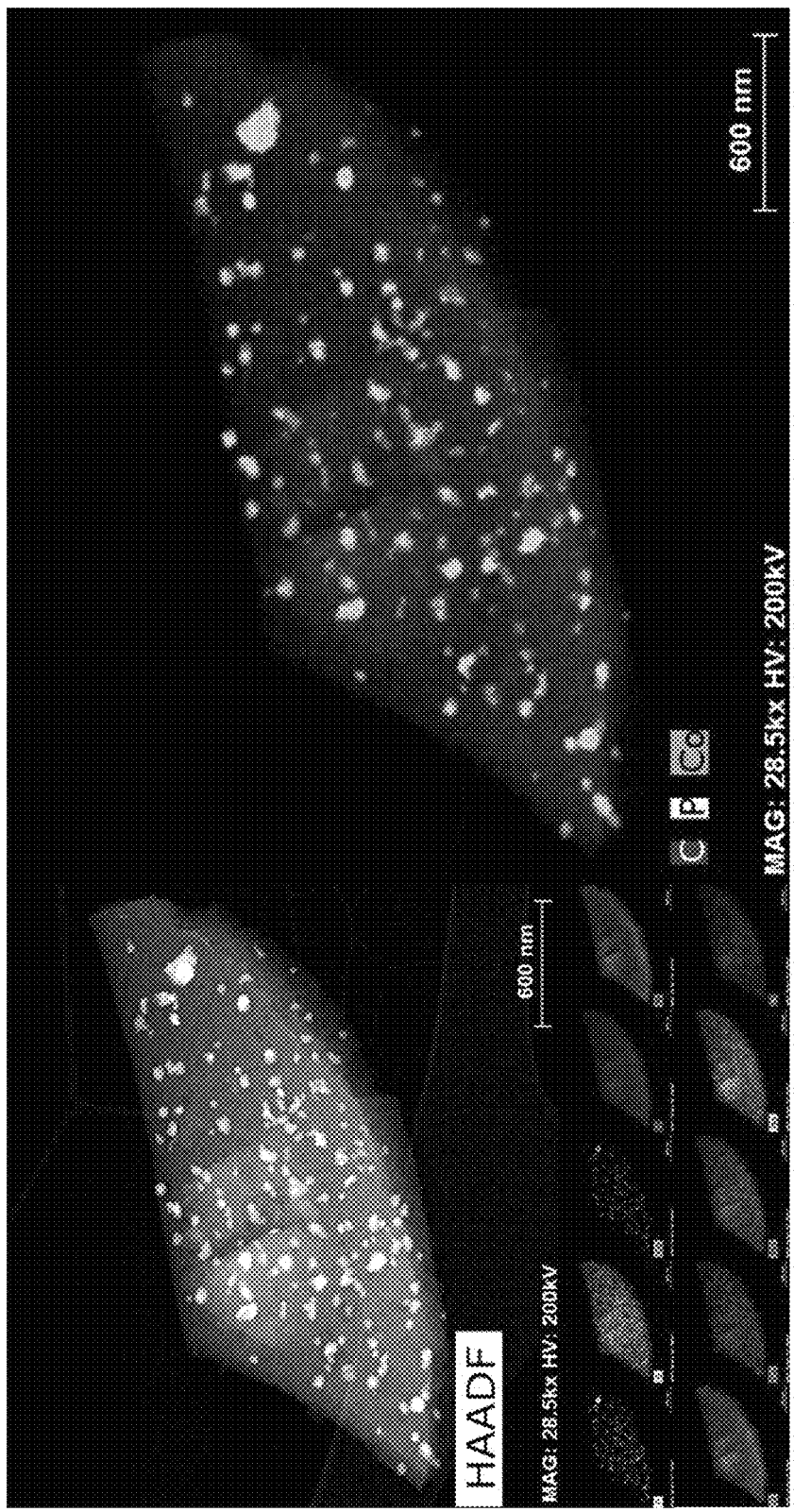
FIG. 4 shows mapping analysis images of a metal catalyst supported on a porous carbon support obtained in Test Example 1.

Also, the catalyst prepared in Example 1 was subjected to elemental analysis using the Talos equipment. The result is shown in FIG. 4. Referring to FIG. 4, it was confirmed that the catalyst prepared in Example 1 contains C, H, O, N, P and S as well as K, Na, Ca, Mg and Co.

Test Example 2: X-Ray Diffraction (XRD) Analysis

The catalyst prepared in Example 1 was subjected to XRD analysis using the Dmax2500/PC equipment. Cu kα operating at 60 kV and 300 mA was used as an X-ray light source and measurement was made in a range from 20° to 90° at a scanning rate of 2°/min. The result is shown in FIG. 5.

Figure 5:
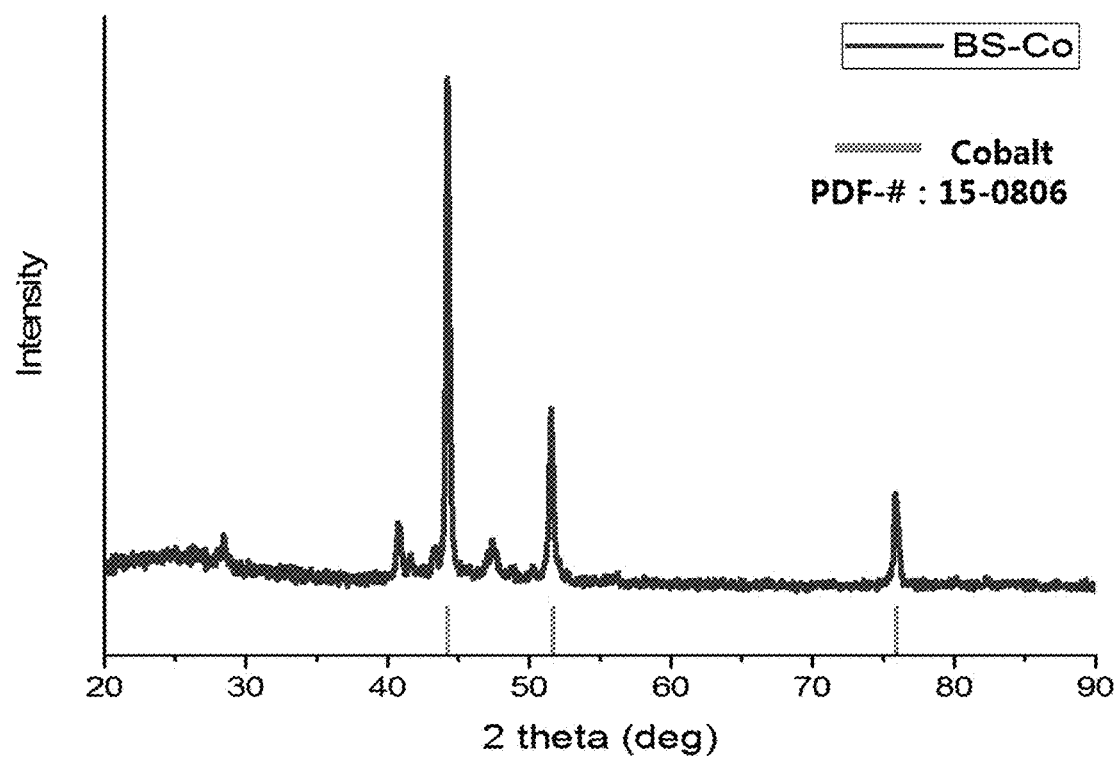
FIG. 5 shows an XRD analysis result of a metal catalyst supported on a porous carbon support prepared in Example 1.

Referring to FIG. 5, it was confirmed from the X-ray diffraction analysis result of the metal catalyst supported on a porous carbon support prepared in Example 1 that cobalt is supported in the porous carbon support.

Test Example 3: Analysis of Electrochemical Hydrogen Evolution Activity

Electrochemical analysis was conducted using the Autolab PGSTAT302N equipment.

5 mg of the catalyst of Example 1 or Comparative Example 2, 30 µL of a Nafion solution (5 wt %, Sigma-Aldrich) and 600 µL of isopropyl alcohol were added to a 20-mL vial and a catalyst ink was prepared by performing ultrasonic dispersion for about 10 minutes.

5 µL of the catalyst ink was dropped on an RDE (rotating disk electrode) and then dried for use as a working electrode. A platinum electrode was used as a counter electrode and an SCE (calomel reference electrode) was used as a reference electrode. Oxygen-saturated 0.1 M potassium hydroxide was used as an electrolyte. Specifically, the electrochemical analysis was conducted at room temperature by rotating the RDE electrode at a speed of 1600 rpm. The electrode scanning range was from 0.05 V to 1.05 V vs. RHE (reversible hydrogen electrode) and the scanning was performed at a rate of 5 mV/s.

Figure 6:
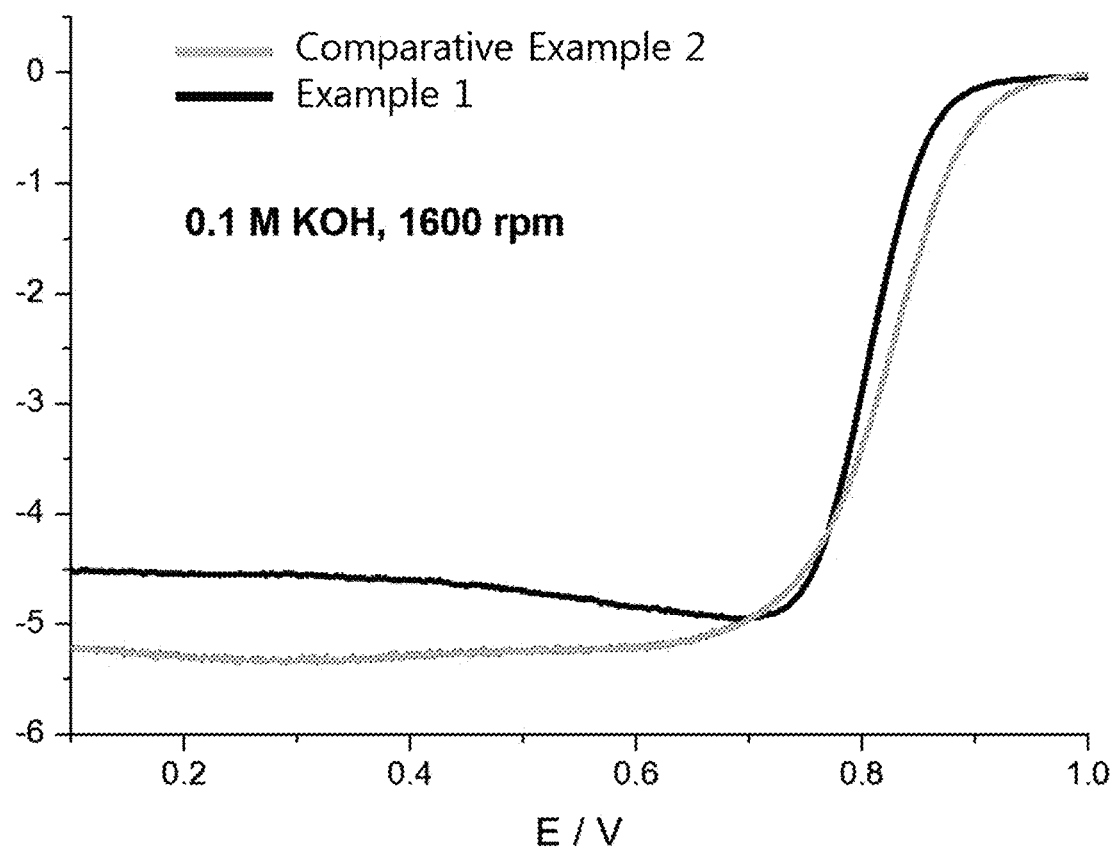
FIG. 6 shows a result of comparing the oxygen reduction reaction performance of a platinum catalyst of Comparative Example 2 and a metal catalyst supported on a porous carbon support of Example 1.

The result of the electrochemical analysis is shown in FIG. 6. It was confirmed from FIG. 6 that the catalyst of Example 1 exhibits almost similar reduction current at the same voltage when compared with the commercially available platinum catalyst of Comparative Example 2, indicating that the catalyst has high oxygen reduction reaction activity.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a metal catalyst supported on a porous carbon support using a plant, comprising:
    (a) providing a plant having roots and stems;
    (b) preparing a metal precursor-absorbed plant by soaking the plant in a solution comprising a metal precursor;
    (c) preparing a catalyst precursor by drying the metal precursor-absorbed plant;
    (d) preparing a char by charring the catalyst precursor, wherein the preparing the char step comprises:
        (d-1) preparing a primary char by charring the catalyst precursor under an air condition;
        (d-2) preparing a secondary char by charring the primary char under an inert gas condition; and
        (d-3) preparing a tertiary char by charring the secondary char under an ammonia gas condition; and
    (e) preparing a metal catalyst supported on a porous carbon support by treating the char with an acid.

2. The method for preparing a metal catalyst supported on a porous carbon support using a plant according to claim 1, wherein the charring in (d-1) is performed at 150-220° C.

3. The method for preparing a metal catalyst supported on a porous carbon support using a plant according to claim 1, wherein the charring in (d-2) is performed at 750-1000° C.

4. The method for preparing a metal catalyst supported on a porous carbon support using a plant according to claim 1, wherein the inert gas in (d-2) is one or more selected from helium, neon, argon, krypton, xenon and radon.

5. The method for preparing a metal catalyst supported on a porous carbon support using a plant according to claim 1, wherein the charring in (d-3) is performed at 700-800° C.

6. The method for preparing a metal catalyst supported on a porous carbon support using a plant according to claim 1, wherein the catalyst precursor comprises one or more element selected from O, N, S, P and Si and a metal nanoparticle.

7. The method for preparing a metal catalyst supported on a porous carbon support using a plant according to claim 1, wherein the metal precursor is one or more selected from a metal acetylacetonate, a metal acetylacetate, a metal acetate, a metal halide, a metal nitrate, a metal hydroxide and a metal carbonyl complex.

8. The method for preparing a metal catalyst supported on a porous carbon support using a plant according to claim 1, wherein a metal comprised in the metal precursor is one or more selected from cobalt (Co), platinum (Pt), palladium (Pd), copper (Cu), iron (Fe), manganese (Mn), molybdenum (Mo), vanadium (V), chromium (Cr), nickel (Ni), gold (Au), silver (Ag), zinc (Zn), rhodium (Rh) and ruthenium (Ru).

9. The method for preparing a metal catalyst supported on a porous carbon support using a plant according to claim 1, wherein the drying in (c) is performed by high-temperature drying at 60 to 120° C. or by freeze-drying at −80 to −60° C.

10. The method for preparing a metal catalyst supported on a porous carbon support using a plant according to claim 1, wherein the treatment with an acid in (e) is performed by dispersing the char in a strong acid selected from sulfuric acid, hydrochloric acid and nitric acid and washing the same.

11. The method for preparing a metal catalyst supported on a porous carbon support using a plant according to claim 10, wherein the concentration of the strong acid is 0.1-1.0M.

* * * * *